(12) United States Patent
Kim et al.

(10) Patent No.: US 6,744,486 B2
(45) Date of Patent: Jun. 1, 2004

(54) LIQUID CRYSTAL DISPLAY DEVICE AND METHOD OF FABRICATING THE SAME

(75) Inventors: Jong-Woo Kim, Kyoungsangbuk-do (KR); Jae-Moon Soh, Kyoungsangbuk-do (KR); Young-Hun Ha, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 5 days.

(21) Appl. No.: 09/885,527

(22) Filed: Jun. 21, 2001

(65) Prior Publication Data
US 2002/0021403 A1 Feb. 21, 2002

(30) Foreign Application Priority Data
Jun. 21, 2000 (KR) .......................... 2000-34298

(51) Int. Cl.$^7$ ................................. G02F 1/13
(52) U.S. Cl. .................. 349/187; 438/30; 438/149
(58) Field of Search ................. 349/42, 43, 44, 349/187, 38, 39; 438/30, 149; 430/5, 20; 257/59, 72

(56) References Cited

U.S. PATENT DOCUMENTS

| | | | |
|---|---|---|---|
| 4,415,262 A | * | 11/1983 | Koyama et al. ............. 355/125 |
| 6,255,130 B1 | * | 7/2001 | Kim ............................. 438/30 |
| 6,287,899 B1 | * | 9/2001 | Park et al. ................... 438/149 |
| 6,335,276 B1 | * | 1/2002 | Park et al. ................... 438/648 |

FOREIGN PATENT DOCUMENTS

| | | |
|---|---|---|
| JP | 04-194823 | 7/1992 |
| KR | 1996-18694 | 6/1996 |

OTHER PUBLICATIONS

Communication from Korean Intellectual Property Office dated May 31, 2002.

* cited by examiner

*Primary Examiner*—Robert H. Kim
*Assistant Examiner*—David Chung
(74) *Attorney, Agent, or Firm*—Morgan Lewis & Bockius LLP

(57) ABSTRACT

A method of fabricating a liquid crystal display device includes steps of forming a first metal layer on the substrate to form a gate line including a gate electrode, a gate pad, and a first capacitor electrode, forming an insulating layer, an active layer, and a second metal layer on the substrate, patterning the second metal layer to form a data line including a data pad, a source electrode, a drain electrode, and a second capacitor electrode, forming a passivation layer to cover the second metal layer, forming a photoresist on the passivation layer, exposing the photoresist using a mask having a light shielding portion, a light transmissive portion, and a semi-transmissive portion, forming a first photoresist portion, a second photoresist portion, and a third photoresist portion, patterning the passivation layer, the active layer, and the insulating layer, and forming a pixel electrode on the passivation layer.

17 Claims, 11 Drawing Sheets

LIQUID CRYSTAL DISPLAY DEVICE AND METHOD OF FABRICATING THE SAME

This application claims the benefit of Korean patent application No. 2000-34298, filed Jun. 21, 2000 in Korea, which is hereby incorporated by reference.

BACKGROUND OF THE INVENTION

1. Field of the Invention

The present invention relates to an active-matrix liquid crystal display (LCD) device and a method of fabricating the same, and more particularly, to an array substrate having thin film transistors for the active-matrix LCD device and the method of fabricating the array substrate. Although the present invention is suitable for a wide scope of applications, it is particularly suitable for reducing a fabrication cost in the LCD device as well as improving a fabrication yield of the LCD device.

1. Discussion of the Related Art

An LCD device uses optical anisotropy to display images. A typical LCD device includes an upper substrate, a lower substrate, and a liquid crystal material interposed therebetween.

FIG. 1 is an exploded perspective view illustrating a typical LCD device 11. The LCD device 11 includes an upper substrate 5 and a lower substrate 22 opposing with each other, and a liquid crystal layer 14 interposed therebetween. The upper substrate 5 and the lower substrate 22 are alternatively called a color filter substrate and an array substrate, respectively. On the upper substrate 5, a black matrix 6 and a color filter layer 7 that includes a plurality of sub-color-filters red (R), green (G), and blue (B) are formed. The black matrix 6 surrounds each sub-color-filter to form an array matrix feature. Further on the upper substrate 5, a common electrode 18 is formed to cover the color filter layer 7 and the black matrix 6.

On the lower substrate 22, opposing the upper substrate 5, a thin film transistor (TFT) "T" is formed as a switching element in the shape of an array matrix corresponding to the color filter layer 7. In addition, a plurality of crossing gate lines 13 and data lines 15 are positioned such that the TFT "T" is located near each crossing portion of the gate lines 13 and the data lines 15, thereby defining a pixel region "P". In the pixel region "P", a pixel electrode 17 is disposed and is made of a transparent conductive material, usually indium tin oxide (ITO).

Liquid crystal molecules of the liquid crystal layer 14 are aligned according to electric signals applied by the TFT "T", thereby controlling incident rays of light to display an image. Specifically, electrical signals applied to the gate line 13 and the data line 15 are transmitted to a gate electrode and a source electrode of the TFT "T", respectively. The signal applied to the drain electrode is transmitted to the pixel electrode 17 thereby aligning the liquid crystal molecules of the liquid crystal layer 14. Then, rays of back light (not shown) selectively pass through the liquid crystal layer 14 to display an image.

A fabricating process of the above-mentioned array substrate requires repeated steps of depositing and patterning of various layers. The patterning step adopts a photolithography mask step (a masking step) including selective light exposure using a mask (photomask). Since one cycle of the photolithography step is facilitated with one mask, the total number of masks used in the fabrication process is a critical factor in determining the total number of patterning steps. Furthermore, as fabricating processes for the array substrate become more simplified, fabrication errors associated with the fabricating processes may decrease.

It is preferable to reduce the number of masks used for fabricating the array substrate from eight to five. FIG. 2 is a plan view illustrating an array substrate 22 fabricated by applying conventional fabricating processes using five masks. As shown, the array substrate 22 includes a pixel "P" defined by crossing gate line 13 and data line 15. The pixel "P" includes a TFT "T" as a switching element, a pixel electrode 17, and a storage capacitor "C". The TFT "T" includes a gate electrode 26, a source electrode 28, a drain electrode 30, and an active layer 55. The source electrode 28 electrically connects with the data line 15, whereas the gate electrode 26 electrically connects with the gate line 13. The data line 15 is formed over a silicon line 58 (in FIG. 3C) which is integrally formed with the active layer 55, and the silicon line 58 has a shape similar to the data line 15.

The storage capacitor "C" has a "storage on gate" structure, where a capacitor electrode 16 and a portion of the gate line 13 serve as an upper electrode and a lower electrode, respectively, of the storage capacitor "C". This configuration of the storage capacitor "C" has a MIM (metal-insulator-metal) structure.

The fabricating processes for the LCD device is determined according to design specifications for the array substrate and/or specific materials selected for the various layers in the array substrate. For example, in case of fabricating a large-scaled (12 inches or larger) LCD, the specific resistance of a material selected for the gate lines is a critical factor in determining the performance quality of the LCD. Therefore, a highly conductive metal such as aluminum (Al) or aluminum alloys are conventionally used for large-scaled LCD devices.

Referring now to FIGS. 3A to 3E, a conventional five masking process and a more detailed description of the structure of the TFT and storage capacitor will be discussed.

For the TFT, an inverted staggered type is advantageously employed because of its simple structure and superior performance quality. The inverted staggered type TFT is classified into two different types, a back-channel-etch type and an etching-stopper type, according to the method used in forming the channel region of the TFT. The back-channel-etch type has a simpler structure than the etching-stopper type. FIGS. 3A to 3E refer to the back-channel-etch type TFT.

First, a substrate 22 is cleaned to remove particles or contaminants on the surface thereof. Then, as shown in FIG. 3A, a first metal layer is deposited on the substrate 22 using a sputtering process. The first metal layer is then patterned using a first mask to form a gate electrode 26 and a gate line 13. As previously mentioned, a portion of the gate line 13 is used as a lower electrode of the storage capacitor "C" of FIG. 2. Aluminum is conventionally used for forming the gate electrode 26 in order to decrease RC delay. However, pure aluminum is considered chemically weak and may result in the formation of hillocks during high-temperature processing. Accordingly, aluminum alloys or layered aluminum structures are used for the gate electrode instead of a pure aluminum.

Next, as shown in FIG. 3B, a gate insulating layer 50 is formed on the substrate 22 to cover the first metal layer including the gate electrode 26 and the gate line 13. Thereafter, an amorphous silicon layer (a-Si:H) and a doped amorphous silicon layer (n+ a-Si:H) are sequentially formed on the gate insulating layer 50 and subsequently patterned using a second mask to form an active layer 55, an ohmic contact layer 56, a silicon line 58 and a doped silicon line 60. The ohmic contact layer 56 decreases a contact resistance measured between the active layer 55 and a second metal layer that will be formed in a later step. The silicon line 58 and the doped silicon line 60 have a shape similar to that of the data line 15 (in FIG. 2).

Next, as shown in FIG. 3C, a second metal layer is deposited on the gate insulating layer 50, and patterned using a third mask to form a source electrode 28, a drain electrode 30 and a data line 15. The data line 15 is electrically connected to the source electrode 28 and covers the silicon line 58 and the doped silicon line 60. When the silicon line 58 and the doped silicon line 60 are interposed between the data line 15 and the substrate 22, good adhesion for the data line 15 is achieved. Thereafter, using the source electrode 28 and the drain electrode 30 as masks, a portion of the ohmic contact layer 56 between the source electrode 28 and the drain electrode 30 is etched away.

Since there is no etching selectivity between the ohmic contact layer 56 and the active layer 55, care must be taken in etching the ohmic contact layer 56 between the source electrode 28 and the drain electrode 30. In actuality, about 50 to 100 nm of the active layer 55 is etched away when etching the ohmic contact layer 56. The performance characteristics of the TFT depend directly upon etching uniformity of the over-etched portion in the active layer 55.

Next, as shown in FIG. 3D, an insulating material is deposited and subsequently patterned to form a passivation layer 57. This passivation layer 57 serves to protect the active layer 55. The passivation layer 57 includes at least an inorganic insulating material including silicon oxide ($SiO_2$), a silicon nitride ($SiN_x$), or an organic insulating material including benzocyclobutene (BCB). This materials are selected for use as the passivation layer 57 because of their high light-transmittance, improved water-resistance, and high reliability. The passivation layer 57 is patterned using a fourth mask to form a drain contact hole 31 over the drain electrode 30 and a capacitor contact hole 58 over the capacitor electrode 16. The pixel electrode 17 (in FIG. 3E) contacts the drain electrode 30 via the drain contact hole 31, and contacts the capacitor electrode 16 via the capacitor contact hole 58. Though not shown, a data pad contact hole is also formed over a data pad, which is connected with one end of the data line 15, such that a data pad electrode contacts the data pad via the data pad contact hole.

In FIG. 3E, a transparent conductive material such as indium tin oxide (ITO) is deposited on the passivation layer 57, and patterned using a fifth mask to form the pixel electrode 17. As previously mentioned, the pixel electrode 17 contacts the drain electrode 30 via the drain contact hole 31, and contacts the capacitor electrode 16 via the capacitor contact hole 58.

Therefore, five masks are used during conventional processing for fabricating an array substrate of the LCD device. However, if aluminum is selected for forming the gate electrode, at least two additional masks are needed to prevent the formation of hillocks. Accordingly, at least five masking steps, and as many as seven steps, are required in conventional fabricating processing of the array substrate.

As mentioned previously, decreasing the number of masking steps will decrease the associated manufacturing cost and improve manufacturing yield.

SUMMARY OF THE INVENTION

Accordingly, the present invention is directed to a liquid crystal display device and a method of fabricating a liquid crystal display device that substantially obviates one or more of problems due to limitations and disadvantages of the related art.

An object of the present invention is to provide a liquid crystal display device and an improved method of fabricating a LCD device to achieve a high manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device, comprising steps of forming a first metal layer on the substrate to form a gate line including a gate electrode, a gate pad, and a first capacitor electrode, forming an insulating layer, an active layer, and a second metal layer on the substrate, patterning the second metal layer to form a data line including a data pad, a source electrode, a drain electrode, and a second capacitor electrode, forming a passivation layer to cover the second metal layer, forming a photoresist on the passivation layer, exposing the photoresist using a mask having a light shielding portion, a light transmissive portion, and a semi-transmissive portion, forming a first photoresist portion, a second photoresist portion, and a third photoresist portion, patterning the passivation layer, the active layer, and the insulating layer, and forming a pixel electrode on the passivation layer.

In another aspect, a liquid crystal display device includes a substrate, a first metal layer disposed on the substrate, the first metal layer includes a gate line connected to a gate electrode, and a first capacitor electrode, an insulating layer covering the first metal layer, a silicon layer disposed on the insulating layer, a portion of the silicon layer includes an active layer disposed over the gate electrode, a second metal layer disposed on the silicon layer, the second metal layer includes a data line, a source electrode, a drain electrode, and a second capacitor electrode, a passivation layer covering the second metal layer, a side edge portion of the drain electrode being exposed from the passivation layer, and a pixel electrode disposed on the passivation layer, the pixel electrode contacting the side edge portion of the drain electrode.

In another aspect, a halftone mask includes a light shielding portion shielding a photoresist from incident rays of light, a semi-transmissive portion transmitting at least a portion of the incident rays of light to the photoresist, and a light transmissive portion transmitting at least all the incident rays of light to the photoresist.

In another aspect, a liquid crystal display device includes a substrate, a first metal layer disposed on the substrate, the first metal layer includes at least a gate line that is connected to a gate electrode, and a first capacitor electrode, one end of the gate line is electrically connected to a gate pad, an insulating layer covering the first metal layer, a gate pad contact hole formed passing through the insulating layer to uncover a portion of the gate pad, a silicon layer disposed on the insulating layer, a portion of the silicon layer includes an active layer disposed over the gate electrode, a second metal layer disposed on the silicon layer, the second metal layer includes at least a data line, a source electrode, a drain electrode, a second capacitor electrode, and a data pad, a passivation layer covering the second metal layer, a side edge portion of the drain electrode being exposed from the passivation layer, and a pixel electrode disposed on the passivation layer, the pixel electrode contacting the side edge portion of the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A to 8A are plan views showing a fabricating sequence of the array substrate of FIG. 4;

FIGS. 5B to 8B are cross-sectional views showing the fabricating sequence of the array substrate of FIG. 4;

DETAILED DESCRIPTION OF THE PREFERRED EMBODIMENTS

Reference will now be made in detail to the preferred embodiments of the present invention, examples of which are illustrated in the accompanying drawings.

Figure 1:
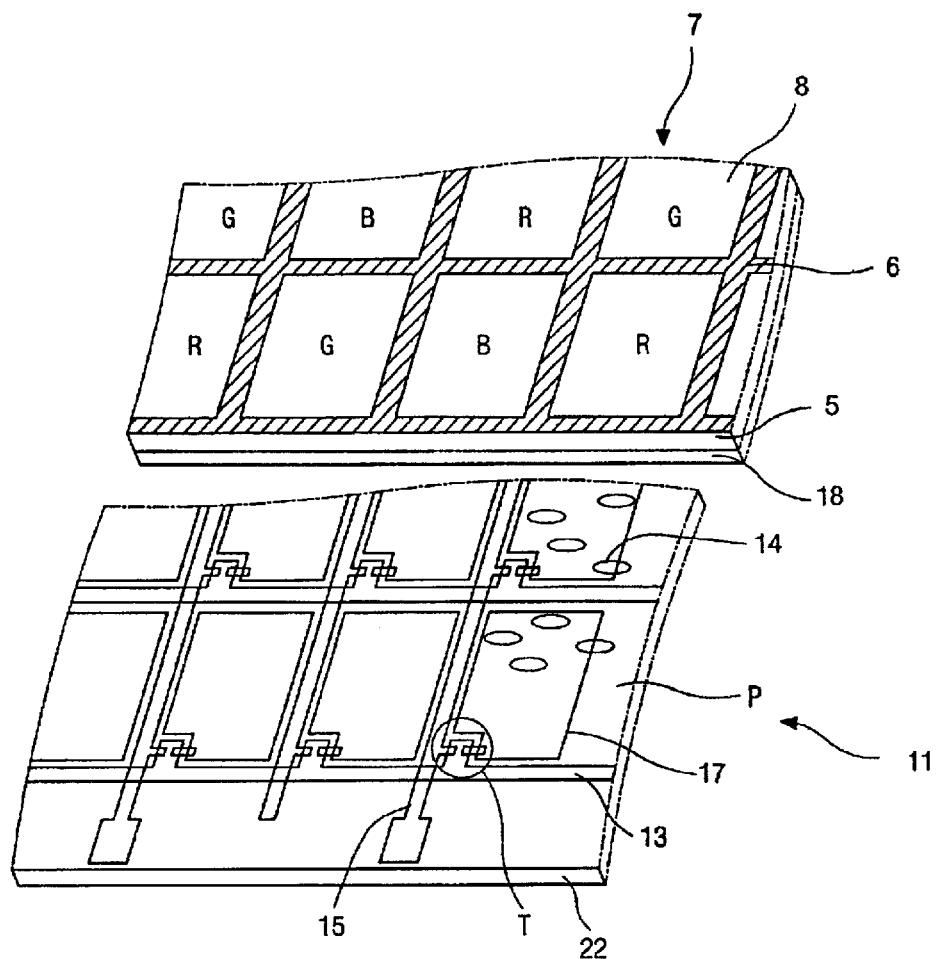
FIG. 1 is an exploded perspective view showing a typical transflective LCD device.
Figure 2:
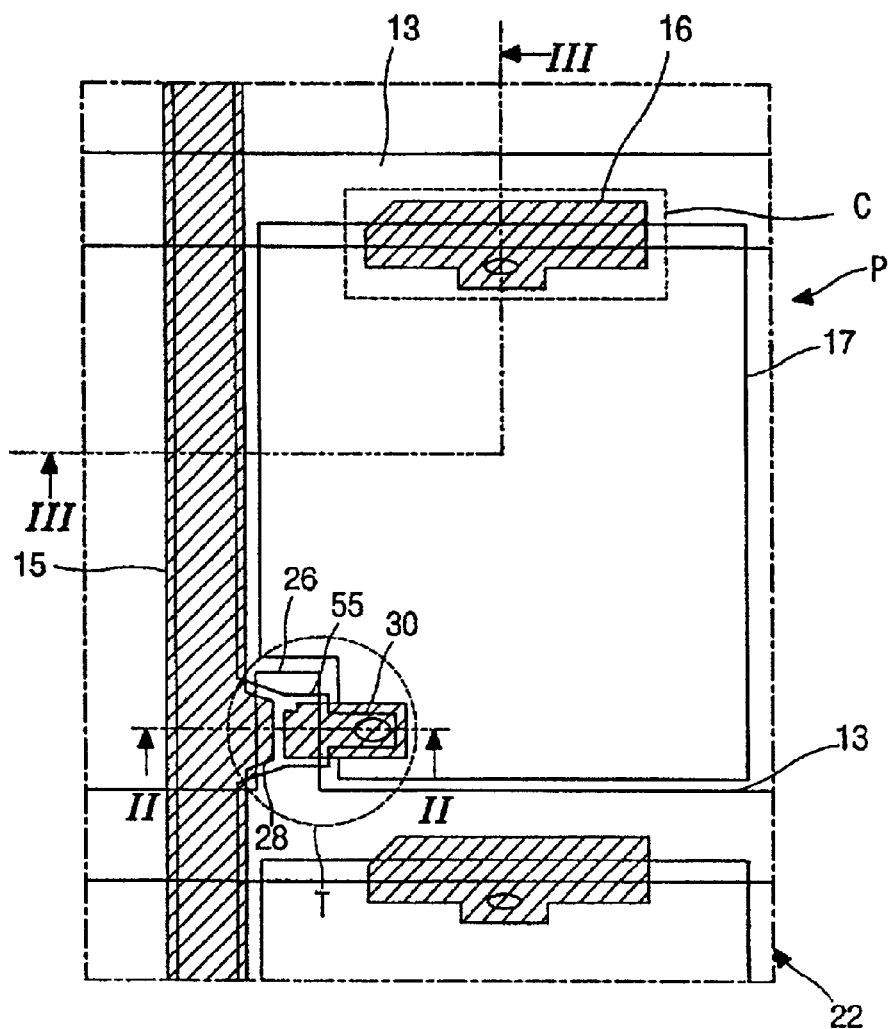
FIG. 2 is a plan view showing a typical array substrate of an LCD device.
Figure 3A:
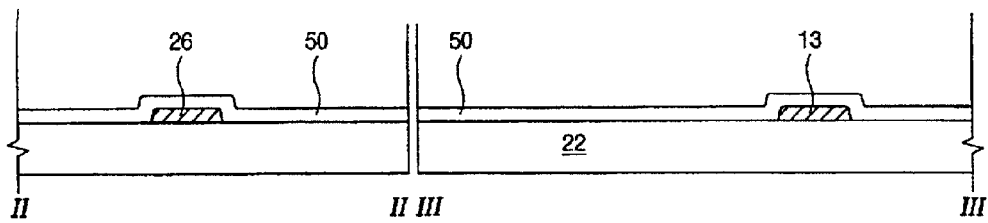
FIGS. 3A to 3E are cross-sectional views taken along lines "II—II" and "III—III" of FIG. 2.
Figure 3B:
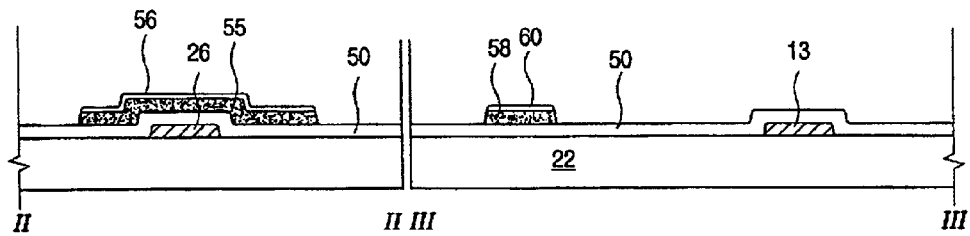
Figure 3C:
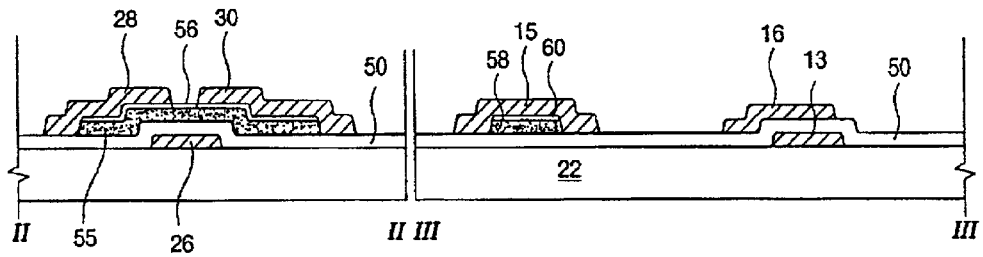
Figure 3D:
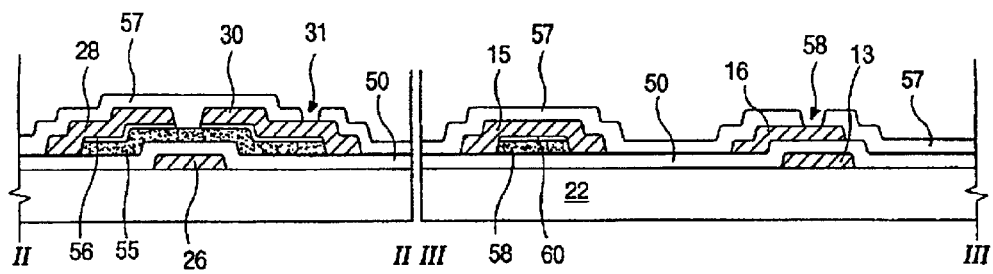
Figure 3E:
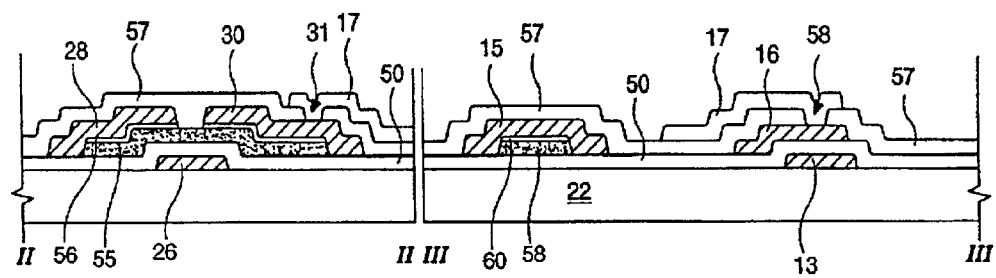
Figure 4:
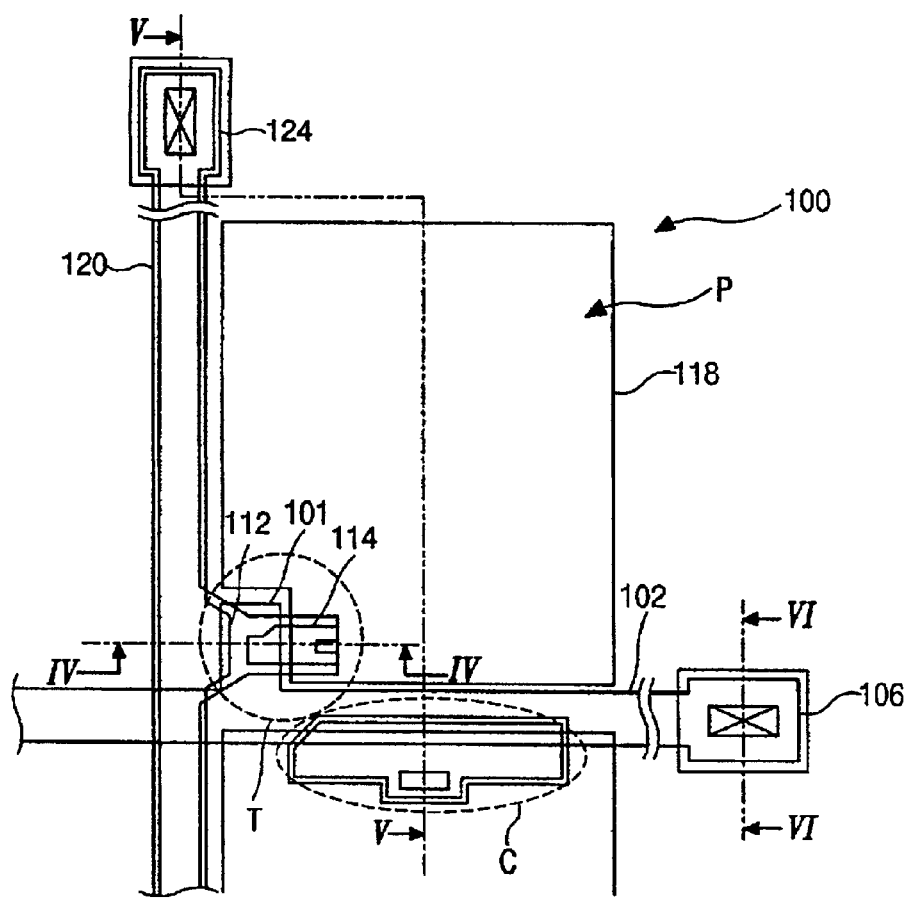
FIG. 4 is a plan view showing an array substrate of an LCD device according to the an embodiment of the present invention.

In FIG. 4, a gate line 102 and a data line 120 are formed on an array substrate 100. The gate lines 102 and the data line 120 cross with each thereby defining a pixel region "P". The gate line 102 is arranged in a transverse direction and includes an integrally-formed gate electrode 101. The data line 120 is perpendicular to the gate line 102 and includes an integrally-formed source electrode 112. A drain electrode 114 is formed to be spaced apart from the source electrode 112. The gate electrode 101, the source electrode 112, and the drain electrode 114 define a TFT "T", which serves as a switching element. In addition, a gate pad 106 and a data pad 124 are formed at respective ends of the gate line 102 and the data line 120 and a pixel electrode 118 is formed in the pixel region "P". The pixel electrode 118 is electrically connected with drain electrode 114 of the TFT "T".

A passivation layer 122 (in FIG. 7B) is formed to cover the electrodes of TFT "T" and is subsequently patterned using a halftone mask. During the patterning of the passivation layer 122 (in FIG. 7B), portions of silicon layers 202a and 202b (in FIG. 6B) are simultaneously patterned using the same halftone mask.

Referring now to FIGS. 5A to 8A and 5B to 8B, a method for fabricating the array substrate 100 according to an embodiment of the present invention is explained.

Figure 5A:
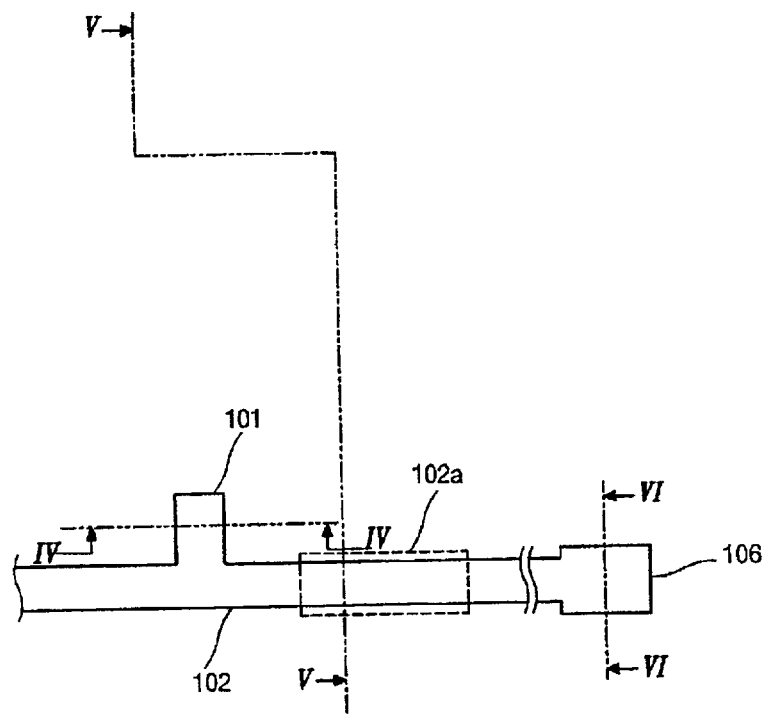
Figure 5B:
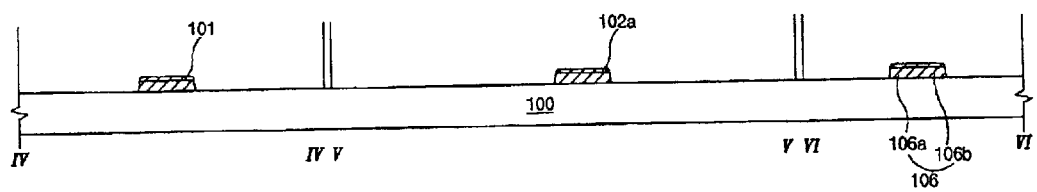

FIGS. 5A and 5B illustrate a first masking step, where a first metal layer is deposited on the substrate 100, and is subsequently patterned using a first mask to form a gate line 102, a gate electrode 101, and a gate pad 106. As shown in FIG. 5A, the gate electrode 101 integrally protrudes from the gate line 102, and a portion of the gate line 102 serves as a first capacitor electrode 102a. Alternatively, the gate electrode 101 does not have to protrude from the gate line 102, and another portion of the gate line 102 may serve as the gate electrode 101, so that the portion of the gate line 102 which serves as the gate electrode 101 is defined as the first capacitor electrode 102a.

The first metal layer includes at least a material selected from a group consisting of chromium (Cr), molybdenum (Mo), and aluminum-based alloys. Since aluminum-based alloys have very low electrical resistance, small RC delays can be achieved by the gate line 102. However, aluminum-based alloys are considered chemically weak. Therefore, use of aluminum-based alloys for the gate line 102 may cause corrosion during etching steps resulting in breaking defects in the gate line 102. To avoid corrosion, aluminum-based alloys that include molybdenum (Mo) materials together with aluminum-neodymium (AlNd) materials protect the aluminum-neodymium (AlNd) materials from chemical reaction. In other words, the first metal layer including the gate line 102 and gate pad 106 consists of first and second metal material layers of aluminum-neodymium (AlNd) materials and molybdenum (Mo) materials, respectively. For example, the gate pad 106 includes an aluminum-neodymium (AlNd) gate pad portion 106a and a molybdenum (Mo) gate pad portion 106b that is layered on the aluminum-neodymium (AlNd) gate pad portion 106a.

Figure 6A:
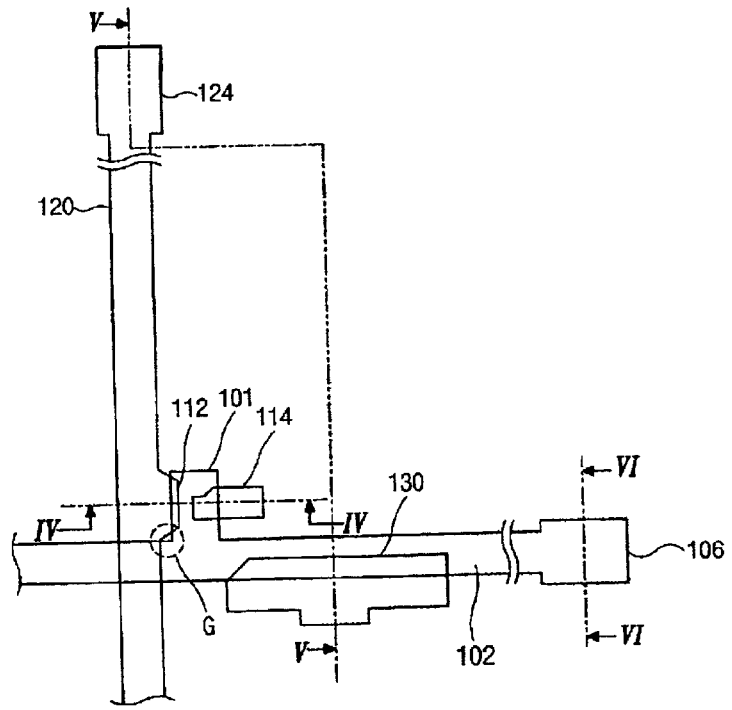
Figure 6B:
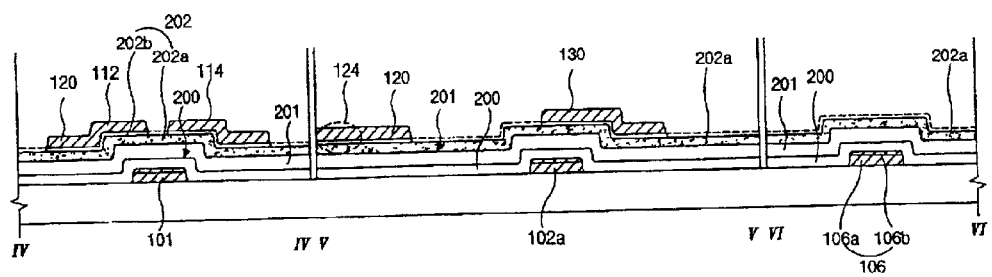

FIGS. 6A and 6B show a second masking step where a data line 120 and a second capacitor electrode 130 are formed.

As shown in FIG. 6B, a first insulating layer 200, a second insulating layer 201, an amorphous silicon layer 202a, a doped amorphous silicon layer 202b, and a second metal layer are sequentially deposited on the substrate 100. The second metal layer is subsequently patterned using a second mask to form the data line 120, a data pad 124, a source electrode 112, a drain electrode 114, and the second capacitor electrode 130. Thereafter, using the patterned second metal layer as a mask, selective portions of the doped amorphous silicon layer 202b is further etched away. Specifically, residual portions of the doped amorphous silicon layer 202b positioned under the source electrode 112 and the drain electrode 114 serve as an ohmic contact layer 202b. As previously explained, a portion of the amorphous silicon layer 202a is also etched away by over-etching.

In FIGS. 6A and 6B, the data pad 124 is disposed at one end of the data line 120, and the drain electrode 114 is spaced apart from the source electrode 112, which is integrally protruded from the data line 120. The second capacitor electrode 130 is disposed over the first capacitor electrode 102a, thereby forming electrodes of a storage capacitor "C". The second insulating layer 201 compensates for stepped portions of the first insulating layer 200 thereby preventing a short circuit between the gate line 101 and the data line 120.

Figure 7A:
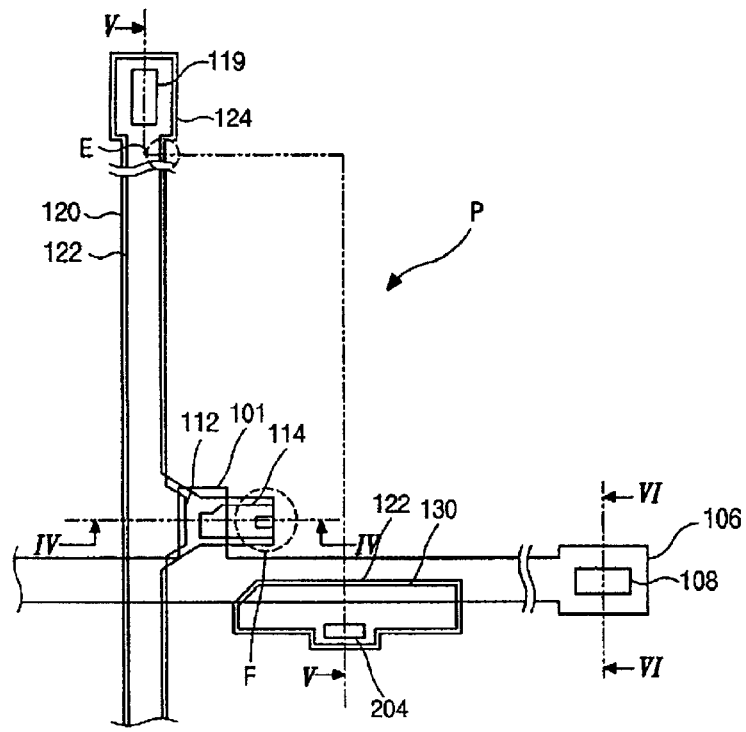
Figure 7B:
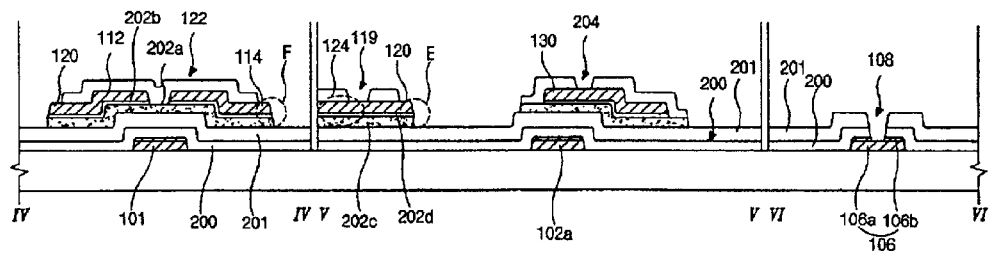

FIGS. 7A and 7B show a third masking step, where a passivation layer 122 is patterned using a third mask.

In FIG. 7B, an insulating material is deposited to cover the second metal layer patterned during the second masking step. Then, the insulating material is patterned using a third mask such that the passivation layer 122 is formed. The third mask is preferably a halftone mask, which will be explained hereinafter with reference to FIG. 9A. The passivation layer 122 is slightly narrower than the data line 120 resulting in a side portion "E" of the data line 120 being exposed out of the passivation layer 122. As shown in a drain side edge portion "F", the passivation layer 122 on the drain electrode 114 is slightly smaller resulting in a side portion and a small upper portion of the drain electrode 114 being exposed out of the passivation layer 122.

Figure 9A:
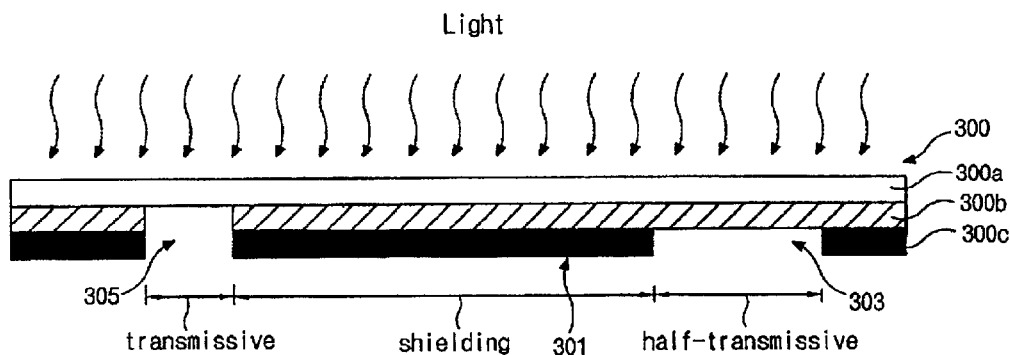
FIG. 9A is a cross-sectional view showing a halftone mask used for fabricating the array substrate according to the present embodiment.

In addition, a capacitor contact hole 204 is formed through the passivation layer 122 and is positioned over the second capacitor electrode 130, and a data pad contact hole 119 is formed through the passivation layer 122 and is positioned over the data pad 124. However, a gate pad contact hole 108 is formed passing through the first insulating layer 200 and the second insulating layer 201 and is positioned over the gate pad 106. In actuality, the gate pad contact hole 108 is formed passing through the amorphous silicon layer 202a, the first insulating layer 200, and the second insulating layer 201, as well as passing through the passivation layer 122. To form the gate pad contact hole 108, the halftone mask of FIG. 9A is used during the third masking step. A more detailed explanation of the gate pad contact hole 108 will be provided hereinafter with reference to FIGS. 10A to 10B.

During the third masking step, a portion of the amorphous silicon layer 202a is simultaneously etched together with the passivation layer 122. Accordingly, portions of the amorphous silicon layer 202a remain below the source electrode 112, the drain electrode 114, the data line 120, the data pad 124, and the second capacitor electrode 130.

Referring to FIG. 7B, since the date line 120 is made of an etch-resistive material, chromium (Cr) for example, residual silicon lines 202c and 202d are formed having about the same size as the data line 120. Furthermore, when the gate pad contact hole 108 is formed during the third masking step, a portion of the molybdenum (Mo) gate pad portion 106b is etched away thereby exposing a portion of the aluminum-neodymium (AlNd) gate pad portion 106a. Then, a gate pad electrode 107 (in FIG. 8B) is formed to directly contact the aluminum-neodymium (AlNd) gate pad portion 106a as well as an inner side surface of the molybdenum gate pad layer 106b of the gate pad 106. However, an oxide film is formed between the aluminum-neodymium (AlNd) gate pad portion 106a and the gate pad electrode 107 thereby increasing a contact resistance therebetween. To limit the increase in contact resistance between the aluminum-neodymium (AlNd) gate pad portion 106a and the gate pad electrode 107, the gate pad contact hole 108 includes a plurality of smaller contact holes such that the gate pad electrode 107 more contacts the molybdenum (Mo) gate pad portion 106b to achieve a low contact resistance.

As explained above, during the third masking step shown in FIGS. 7A and 7B, the passivation layer 122 and a portion of the amorphous silicon layer 202a are simultaneously etched. Accordingly, the gate line 102 and gate pad 106 are protected by the first insulating layer 200 and the second insulating layer 201.

Figure 8A:
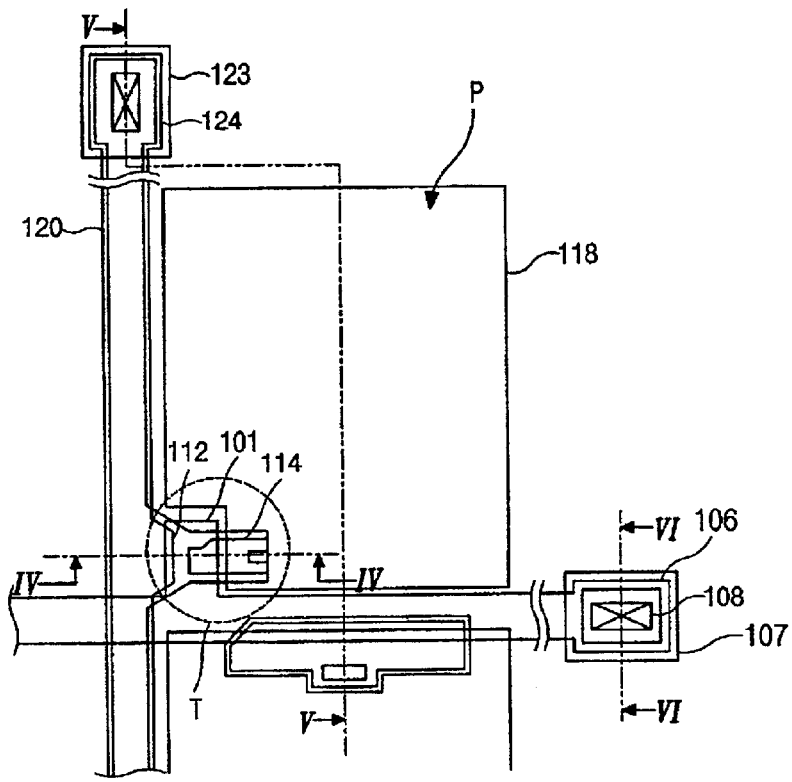
Figure 8B:
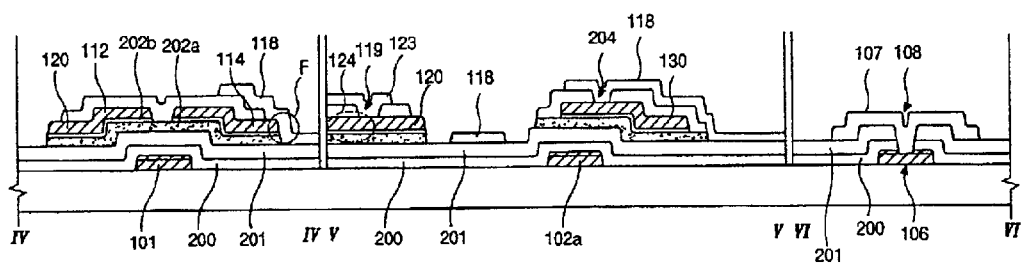

FIGS. 8A and 8B show a fourth masking step, where the pixel electrode 118 is formed. A transparent conductive material is first deposited on the passivation layer 122, and is subsequently patterned using a fourth mask to form the pixel electrode 118, the gate pad electrode 107, and a data pad electrode 123. The transparent conductive material includes at least a material selected from a group consisting of indium tin oxide (ITO) and indium zinc oxide (IZO).

In FIG. 8B, the drain side edge portion "F" of the pixel electrode 118 contacts side and upper portions of the drain electrode 114. The pixel electrode 118 further contacts the second capacitor electrode 130 via the capacitor contact hole 204. In addition, the gate pad electrode 107 contacts the gate pad 106 via the gate pad contact hole 108, and the data pad electrode 123 contacts the data pad 124 via the data pad contact hole 119.

Figure 9B:
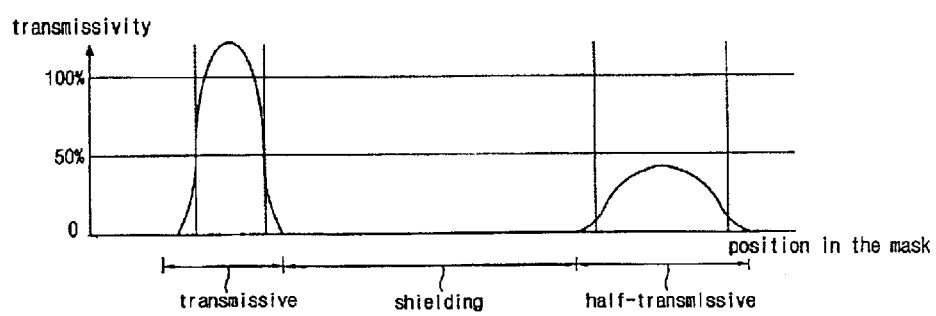
FIG. 9B shows a transmissivity characteristic of the halftone mask of FIG. 9A.
Figure 9C:
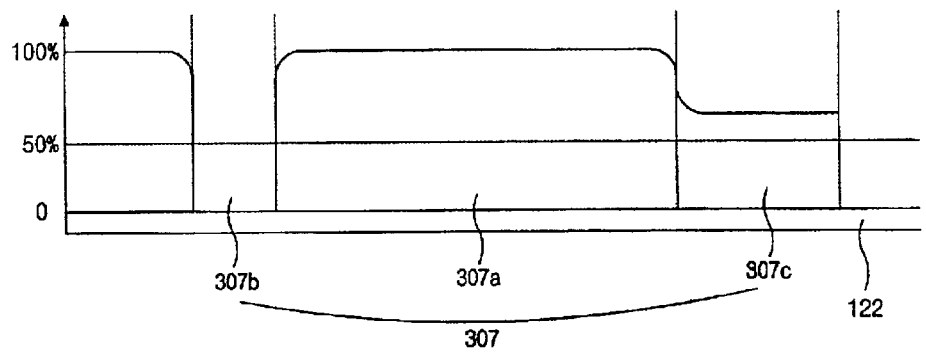
FIG. 9C shows a positive photoresist developed after using the halftone mask of FIG. 9A.

For the array substrate according to an embodiment of the present invention, a halftone mask is used as the third mask for patterning the passivation layer. During the third masking step, a photoresist is formed on the passivation layer and is subsequently exposed to light using the halftone mask, thereby forming three differently exposed portions in the photoresist. Referring to FIGS. 9A to 9C, the structure and exposure characteristics of the halftone mask used for the embodiment will be explained.

In FIG. 9A, the third mask 300 of the third masking step is a halftone mask, which includes a light shielding portion 301 that shields most incident rays of light, a semi-transmissive portion 303 that transmits a portion of incident rays of light, and a light transmissive portion 305 that transmits most incident rays of light. To fabricate the halftone mask 300a semi-transmissive layer 300b and an opaque layer 300c are sequentially deposited on a transparent substrate 300a and are then subsequently selectively patterned. The semi-transmissive layer 300b and the opaque layer 300c include at least molybdenum silicide (MoSi) materials and chromium (Cr) materials, respectively. Molybdenum silicide (MoSi) materials exhibit a transmissivity of about 35% and chromium (Cr) materials have low reflectivity properties. Specifically, the semi-transmissive portion 303 includes at least a molybdenum silicide (MoSi) material layer, and the light shielding portion 301 includes at least a chromium (Cr) material layer as well as a molybdenum silicide (MoSi) material layer. When the semi-transmissive portion 303 is used for exposing a photoresist to light, exposure time can control a thickness of a residual photoresist portion after an etching.

As shown in FIGS. 9B and 9C, because the light shielding portion 301 has a transmissivity of about 0%, a corresponding first photoresist portion 307a of a positive photoresist 307 is shielded from incident rays of light. Accordingly, after the positive photoresist 307 is developed, the first photoresist portion 307a is residual on the passivation layer 122. However, because the semi-transmissive portion 303 has a transmissivity of about 35%, a corresponding second photoresist portion 307b that is exposed through the light transmissive portion 305 is almost totally excluded by the developing process. In addition, a third photoresist portion 307c is exposed through the semi-transmissive portion 303 having a transmissivity of about 35%, wherein about 75% of the third photoresist portion 307c is residual after the developing process.

By using the halftone mask 300 for the third masking step, stacked layers can be simultaneously patterned by a single etching step. During the third masking step shown in FIGS. 7A and 7B, the passivation layer 122 and portions of the active layer 202a are simultaneously etched in the pixel region "P". In addition, portions of the passivation layer 122, the active layer 202a, the first insulating layer 200, and the second insulating layer 201 are simultaneously etched above the gate pad 106.

Figure 10A:
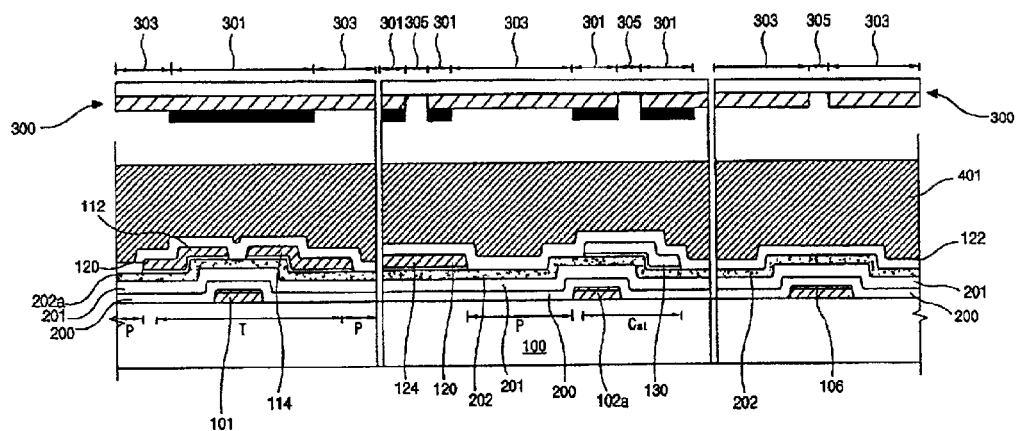
FIGS. 10A and 10B are cross-sectional views showing sub-steps of the third masking step according to the present embodiment.
Figure 10B:
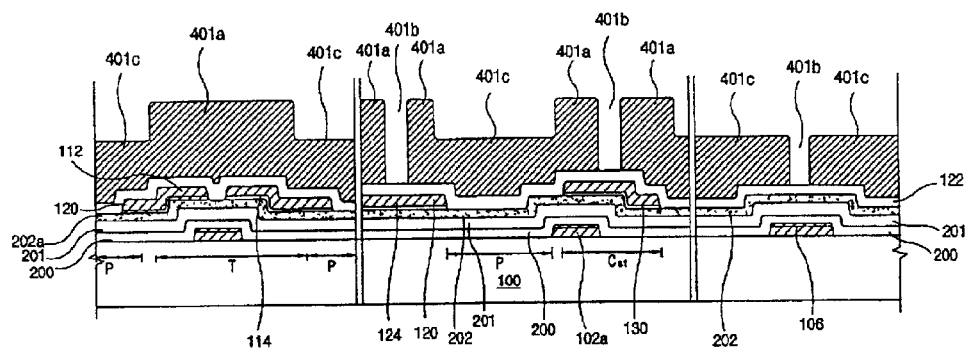

FIGS. 10A to 10C show sub-steps for the third masking step performed after the second masking step shown in FIGS. 6A and 6B.

In FIG. 10A, the passivation layer 122 is formed on the array substrate 100 and covers the source electrode 112, the drain electrode 114, the data line 120, and the second capacitor electrode 130. Then, to pattern the passivation layer 122, a photoresist 401 is formed on the passivation layer 122, and the halftone mask 300 is positioned over the photoresist 401 to expose selective portions of the photoresist 401 to light.

In FIG. 10A, while some portions of the first the passivation layer 122 directly contact the second metal layer other portions of the passivation layer 122 directly contact portions of the silicon layer 202. For example, the first insulating layer 200 and the second insulating layer 201, the silicon layer 202, and the passivation layer 122 are sequentially disposed upon the gate pad 106 and within the pixel region "P". However, the drain electrode 114 and the second capacitor electrode 130 of the second metal layer are disposed above the gate electrode 101 and the first capacitor electrode 102a, respectively, and are all disposed beneath the passivation layer 122. Accordingly, the gate pad contact hole 108 (in FIG. 7B) is formed during etching by removing corresponding portions of the first insulating layer 200, the second insulating layer 201, the silicon layer 202, and the passivation layer 122 disposed over the gate pad 106. In contrast, in the pixel region "P", the passivation layer 122 and silicon layer 202 will be etched and the first insulating layer 200 and the second insulating layer 201 will remain. Furthermore, the passivation layer 122 will be etched over the second capacitor electrode 130 and the data pad 124, thereby forming the capacitor contact hole 204 (in FIG. 7B) and the data pad contact hole 119 (in FIG. 7B), respectively. In other words, various layers are selectively etched during the third masking step according to the present embodiment by a single, selective etching step.

As shown in FIG. 10A, the light shielding portions 301 of the halftone mask 300 are disposed over corresponding portions of the TFT "T", the data line 120, and the second capacitor electrode 130. The semi-transmissive portions 303 of the halftone mask 300 are disposed over the pixel region "P", lateral portions of the gate pad 106, a portion of the source electrode 112, and a portion of the drain electrode 114. In addition, the light transmissive portions 305 of the halftone mask 300 are disposed over corresponding portions of the data pad 124, the gate pad 106, and the second capacitor electrode 130.

Thereafter, as shown in FIG. 10B, the photoresist 401 is exposed to light and developed thereby forming first 401a, second 401b, and third 401c photoresist portions each having different corresponding thicknesses. The first photoresist portions 401a that correspond to the light shielding portions 301 are almost totally residual, but the second photoresist portions 401b that correspond to the light transmissive portions 305 are almost totally excluded after developing. In addition, the third photoresist portions 401c that correspond to the semi-transmissive portions 303 have a desired thickness in relation to the transmissivity of the semi-transmissive portions 303. Specifically, the exposure time is controlled such that the third photoresist portion 401c preferably has a thickness of 800 to 900 Å (angstrom) when the first photoresist portion 401a has a thickness of about 3 $\mu$m.

After the photoresist 401 has been developed, the various layers are patterned using a dry etching process. Accordingly, because the data pad 124 and the second capacitor electrode 130 include at least chromium (Cr) materials that have etch resistant properties, they serve as an etch stop. After the third masking step is finished, the passivation layer 122 and the silicon layer 202 are shaped as shown in FIG. 7B. Moreover, corresponding portions of the first insulating layer 200, the second insulating layer 201, the silicon layer 202, and the passivation layer 122 disposed over the gate pad 106 are etched, thereby forming the gate pad contact hole 108. As a result, the passivation layer 122 and the silicon layer 202 disposed over the gate pad 106 are removed such that the gate pad 106 is laterally covered by the first insulating layer 200 and the second insulating layer 201. In the pixel region "P" (in FIG. 7A), the passivation layer 122 and silicon layer 202 are etched, but the first and second insulating layers 200 and 201 remain. Over the second capacitor electrode 130 and the data pad 124, the passivation layer 122 is etched, thereby forming the capacitor contact hole 204 and the data pad contact hole 119, respectively. Furthermore, as shown in the drain side edge portion "F" (in FIG. 7B), a side portion of the drain electrode 114 is exposed.

As explained above, because the present invention uses the halftone mask for the third masking step, process fabrication of an LCD device is simplified.

For the array substrate according to the present invention, the pixel electrode is disposed over the gate insulating layers and contacts the side portion of the drain electrode. The storage capacitor has a metal-insulator-semiconductor-metal (MISM) structure that includes the first capacitor electrode, the first gate insulating layer, the second gate insulating layer, the active layer, and the second capacitor electrode.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising the steps of:

forming a first metal layer on a substrate to form a gate line including a gate electrode, a gate pad, and a first capacitor electrode;

forming an insulating layer, an active layer, and a second metal layer on the substrate;

patterning the second metal layer to form a data line including a data pad, a source electrode, a drain electrode, and a second capacitor electrode;

forming a passivation layer to cover the second metal layer;

forming a photoresist on the passivation layer;

exposing the photoresist using a mask having a light shielding portion, a light transmissive portion, and a semi-transmissive portion;

forming a first photoresist portion, a second photoresist portion, and a third photoresist portion;

patterning the passivation layer, the active layer, and the insulating layer; and forming a pixel electrode on the passivation layer such that the pixel electrode electrically contacts an upper surface of the second capacitor electrode through a contact hole formed in the passivation layer.

2. The method of fabricating a liquid crystal display device according to claim 1, wherein the gate line and the data line cross with each other to define a pixel region, and the source electrode and the drain electrode are spaced apart from each other.

3. The method of fabricating a liquid crystal display device according to claim 1, wherein the step of depositing and patterning a first metal layer includes a first masking step.

4. The method of fabricating a liquid crystal display device according to claim 1, wherein the step of depositing an insulating layer, an active layer, and a second metal layer includes a second masking step.

5. The method of fabricating a liquid crystal display device according to claim 4, wherein the step of patterning the second metal layer is included in the second masking step.

6. The method of fabricating a liquid crystal display device according to claim 1, wherein the steps of forming a passivation layer, forming a photoresist, exposing the photoresist, forming first, second and third photoresist portions, and patterning the passivation layer are included in a third masking step.

7. The method of fabricating a liquid crystal display device according to claim 6, wherein, in the third masking step, a side portion and upper surfaces of the drain electrode are uncovered, a capacitor contact hole is formed over the second capacitor electrode, and a data pad contact hole is formed over the data pad through the passivation layer, and a gate pad contact hole is formed over the gate pad passing through the insulating layer, the active layer, and the passivation layer.

8. The method of fabricating a liquid crystal display device according to claim 1, wherein the third photoresist portion has a thickness of 800 to 900 Å.

9. The method of fabricating a liquid crystal display device according to claim 1, wherein the first metal layer includes at least a first aluminum neodymium (AlNd) material layer and a second molybdenum (Mo) material layer.

10. The method of fabricating a liquid crystal display device according to claim 1, wherein the insulating layer and the passivation layer include at least an inorganic insulating material.

11. The method of fabricating a liquid crystal display device according to claim 10, wherein the inorganic insulating material includes at least one material selected from a group consisting of silicon oxide ($SiO_2$) and silicon nitride ($SiN_x$).

12. The method of fabricating a liquid crystal display device according to claim 1, wherein the insulating layer and the passivation layer include at least organic insulating materials.

13. The method of fabricating a liquid crystal display device according to claim 12, wherein the organic insulating materials include at least one material selected from a group consisting benzocyclobutene (BCB) and an acryl-based resin.

14. The method of fabricating a liquid crystal display device according to claim 1, wherein a portion of the passivation layer disposed over the data line has a width smaller than a corresponding width of the data line.

15. The method of fabricating a liquid crystal display device according to claim 1, wherein the light shielding portion of the mask includes at least an opaque metal material having a low reflectivity.

16. The method of fabricating a liquid crystal display device according to claim 15, wherein the opaque metal includes at least a chromium (Cr) material.

17. The method of fabricating a liquid crystal display device according to claim 1, wherein the semi-transmissive portion of the mask includes at least a molybdenum silicide (MoSi) material.

* * * * *